United States Patent [19]

McCullough

[11] 3,989,191

[45] Nov. 2, 1976

[54] THRUST CONTROL NOZZLE FOR ROCKETS

[75] Inventor: Edward E. McCullough, Brigham City, Utah

[73] Assignee: Thiokol Corporation, Newtown, Pa.

[22] Filed: Sept. 13, 1971

[21] Appl. No.: 179,792

[52] U.S. Cl. .................. 239/265.15; 239/265.19
[51] Int. Cl.² .................. B64C 15/08; B63H 11/10
[58] Field of Search .............. 239/265.11, 265.19, 239/265.15; 60/230, 232, 271

[56] References Cited
UNITED STATES PATENTS

| | | | |
|---|---|---|---|
| 2,857,119 | 10/1958 | Morguloff | 239/265.19 X |
| 2,987,879 | 6/1961 | Brown | 239/265.19 X |
| 3,130,544 | 4/1964 | Penza | 239/265.19 |
| 3,332,243 | 7/1967 | Wilson | 239/265.11 X |
| 3,402,894 | 9/1968 | Wynosky et al. | 239/265.19 X |
| 3,659,789 | 5/1972 | Schultz | 239/265.19 |

*Primary Examiner*—Robert S. Ward, Jr.
*Attorney, Agent, or Firm*—Stanley A. Marcus; Edward E. McCullough

[57] ABSTRACT

The central portion of the aft closure of a rocket motor case is recessed inwardly and held in fixed relationship to an apertured aft closure dome by brackets. A sleeve, operating in sealed relationship inside an annular, aftwardly extending flange fixed to the periphery of the recessed aft closure section, is joined by radial arms to a socket on a ball joint centrally fixed to the aft side of the recessed aft closure section. A hollow spike nozzle member, attached to the socket by a hydraulic actuator, may operate with sliding motion and in sealed relationship to the inner, cylindrical surface of the sleeve. A cowl surrounds the spike nozzle member. It is fixed to the sleeve by brackets and may slide against a partial spherical surface on annular flanges surrounding the aperture of the aft closure dome, in sealed relationship therewith. Secondary hydraulic actuators, fixed to the radial arms on the sleeve bear against the recessed aft closure to rotate the sleeve, the cowl, and the spike nozzle member about the ball joint. The direction of the thrust vector of the rocket may be altered by this rotation, and its magnitude may be altered by axial movement of the spike nozzle member relative to its cowl.

5 Claims, 1 Drawing Figure

U.S. Patent
Nov. 2, 1976
3,989,191
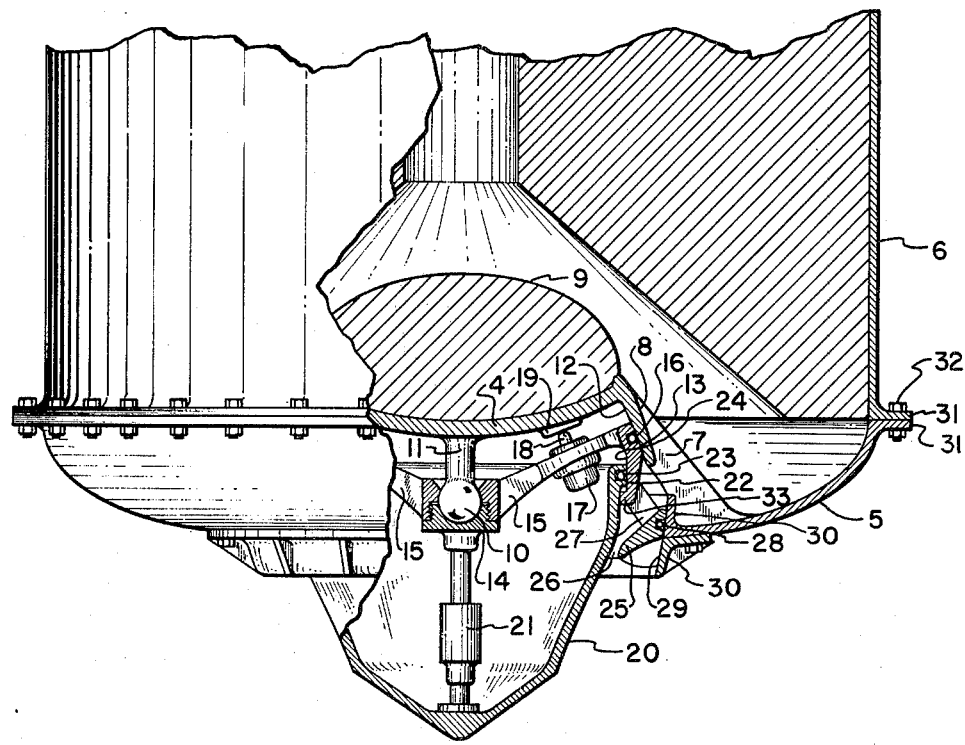
INVENTOR.
EDWARD E. McCULLOUGH
BY
*Edward E. McCullough*
AGENT

THRUST CONTROL NOZZLE FOR ROCKETS

BACKGROUND OF THE INVENTION

This invention relates to thrust nozzles for rockets, and particularly to those using spike nozzle members and having the capability of altering the direction of thrust of a rocket and also its magnitude. The invention herein described was made in the course of or under a contract with the U.S. Air Force.

Spike nozzles for rockets have a number of advantages over the conventional, convergent-divergent type of thrust nozzle. In general, they can be made more compact in an axial direction, and are more efficient over a greater range of altitude. However, there has been no satisfactory means for making spike nozzles that are capable of controlling both the direction and magnitude of the thrust vector of the rocket. Also, there have been no means for protecting such nozzles from excessive heat and pressure imparted thereto by the propulsive gases of the rocket.

SUMMARY OF THE INVENTION

The present invention, which overcomes these difficulties of the prior art, is built on a recessed, central section of the aft closure of the rocket motor case. This section is spaced inwardly in fixed relationship to a centrally apertured aft closure by brackets. This recessed portion of the aft closure has a mound of solid propellant bonded to its forward side, that serves as an excellent thermal insulation to protect the nozzle apparatus from excessive heat. An annular, aftwardly extending flange is fixed to the edge of the recessed aft closure. A ball joint on a short shaft is fixed centrally to the aft surface of the recessed aft closure section, and a sleeve that fits an inner, spherical surface on the flange is attached to a socket on a ball joint by radial arms. An annular seal on the outside surface of the sleeve provides sealed relationship with the flange on the recessed aft closure. A hollow, spike nozzle member is centrally attached to the socket by a primary hydraulic actuator. A lip on the edge thereof is equipped with an annular seal seated in a groove. It fits in the cylindrical surface on the inside of the sleeve. A cowl surrounding the spike nozzle member, forming an annular throat therewith, is fixed to the sleeve by brackets. Secondary hydraulic actuators, fastened to the radial arms of the sleeve, have actuation arms that bear against bearing surfaces on the recessed aft closure section to rotate the sleeve, the cowl, and the spike nozzle member as a unit to change direction of thrust of the rocket. Actuation of the primary actuator moves the spike nozzle member relative to the cowl, to change the size of the annular throat therebetween and alter the magnitude of thrust of the rocket. The outer surface of the cowl is spherical concentric about the ball joint. It fits in a concave spherical surface, similarly concentric on flanges that surround the aperture of the aft closure. An annular seal seated in a groove in the outer surface of the cowl provides a gas tight seal between these surfaces.

Objects of the invention are to provide a spike, thrust nozzle for rockets that may control both the direction and magnitude of thrust of the rocket. Important features of the invention are that the nozzle mechanism is protected from excessive heat and pressure of the propulsive gases, so that functioning thereof will not be impaired, and so that the size and weight of actuators may be minimized.

Other objects and advantages of the invention will become apparent as the following detailed description is read with reference to the accompanying drawing.

BRIEF DESCRIPTION OF THE DRAWING

The FIG. illustrates a partial, longitudinal section of the invention, installed on a typical rocket motor.

DESCRIPTION OF THE PREFERRED EMBODIMENTS

With reference to the drawing, it may be seen that a recessed, central section 4 of the aft closure 5 of the rocket motor case 6 is spaced inwardly from the apertured, aft closure dome 5 by a plurality of brackets 7. An annular flange 8, to which the brackets 7 are fixed, is attached to the edge of the recessed aft closure 5 and extends aftwardly therefrom. A mound of solid propellant 9 is bonded to the inner side of the recessed aft closure section 4. This serves the double purpose of increasing the propellant loading of the rocket and of providing thermal insulation to protect the nozzle mechanism from heat of the propulsive gases.

A ball joint 10 on a short shaft 11 is centrally fixed to the aft surface of the recessed aft closure 4 and extends aftwardly therefrom. The inner surface 12 of the flange 8 is spherical concentric about the ball joint 10. A sleeve 13 fits inside the flange 8 and is attached to a socket 14 on the ball joint 10 by radial arms 15. The outer surface of the sleeve 13 is spherical to fit that of the flange 8, and an annular rubber seal, seated in a groove therein provides a gas tight seal with the flange 8, as the sleeve 13 is rotated about the ball joint 10. This rotation is accomplished by secondary hydraulic actuators 17, fixed to the radial arms 15 so that the actuation arms 18 may bear against bearing members 19 on the aft surface of the recessed aft closure 4.

A hollow, spike nozzle member 20 is centrally attached, on the inside thereof, to the socket 14 by the primary hydraulic actuator 21. The outer edge of the spike nozzle member 20 has a lip 22 equipped with an annular rubber seal 23, seated in a groove therein, to provide a gas tight seal between the spike nozzle member 20 and a cylindrical, inner surface 24 of the sleeve 13.

An annular cowl 25 surrounds the spike nozzle member 20 to form an annular throat 26 therewith. The cowl 25 is fixed to the outer surface of the sleeve 13 by a plurality of brackets 27, so that the sleeve 13, the spike nozzle member 20, and the cowl 25 are rotated as a unit about the ball joint 10 by the secondary actuators 17. The outer surface of the cowl 25 is equipped with an annular, rubber seal 28, seated in an annular groove therein, that provides a gas tight seal with the spherical surface 29, concentric about the ball joint 10, on the flanges 30 of the aperture edge of the aft closure 5.

The aft closure 5 may be attached to the rocket case 6 by any conventional means, such as the annular flanges 32 and screws 32 therein.

An inwardly projecting stop means 33 on the sleeve 13 engages the lip 22 of the spike nozzle member 20 at its aftmost point of travel to insure a minimum size for the throat 26 and a means for escape of the propulsive gases of the rocket.

In operation, the secondary actuators 17 are operated to rotate the throat 26 about the ball joint 10 to change the direction of the thrust vector. Magnitude of the thrust vector may be altered, within limits, by operating the primary actuator 21 to move the spike nozzle member 20 axially relative to its cowl 25, thereby increasing or decreasing the size of the throat 26.

An important feature of the invention is that the recessed aft closure 4 and its surrounding flange 8 effectively protect the nozzle mechanism from high, blow-out pressure loads that otherwise would be exerted thereon. For this reason, the spike nozzle member 20 and its cowl 25 may be designed such that axial loads thereon may be in balance when the rocket is in full operation. This permits the use of actuators and structural members of minimal size and weight.

The structural members described are ordinarily of steel, and those that are exposed to the heat of the propulsive gases are commonly heavily insulated with carbonaceous materials, or materials that become carbonaceous in such high temperatures. Any of several resins such as phenolics and epoxys, filled with refractory fibers or particles, such as carbon cloth or asbestos, may be used for this purpose.

An invention has been described that constitutes an advance in the art of rocket technology. Although the embodiment described has been quite specific with regard to detail, it should be noted that details may be altered without departing from the scope of the invention, as defined in the following claims.

The invention claimed is:

1. A thrust nozzle apparatus for rockets comprising:
   a centrally apertured aft closure;
   a recessed aft closure section, having an aftwardly-extending, annular flange fixed to the edge thereof, spaced inwardly from the apertured aft closure by brackets fixed to the flange and to the aft closure;
   a ball joint having a short shaft fixed centrally to the aft side of the recessed aft closure section;
   a socket on the ball joint;
   a sleeve concentric about the ball joint and operatively attached to the socket, the sleeve having an outer surface conforming to a spherical surface concentric about the ball joint and fitting a similar spherical surface on the inside of the flange on the recessed aft closure section in sealed relationship therewith;
   a hollow, spike nozzle member having a lip on the edge thereof that fits in sealed relationship with a cylindrical surface on the inside of the sleeve;
   an annular cowl surrounding the spike nozzle member and spaced therefrom by brackets attached to the sleeve;
   sealing means between the cowl and the apertured aft closure;
   a primary, fluid-operated actuator centrally attaching the hollow spike nozzle member to the socket joint for moving the spike nozzle member axially relative to the cowl, whereby the throat formed therebetween may be varied in size to vary the magnitude of thrust of the rocket; and
   secondary actuators operatively attached to the sleeve and having actuation arms that may bear against the recessed aft closure, whereby the sleeve, the spike nozzle member, and the cowl may be rotated as a unit about the ball joint to change the direction of thrust of the rocket.

2. The thrust nozzle apparatus of claim 1 wherein the sealing means between the sleeve and the aperture flange, and between the spike nozzle member and the sleeve, are annular, rubber seals, seated in annular grooves in the sleeve and in the spike nozzle member, respectively.

3. The thrust nozzle apparatus of claim 1 wherein the sealing means between the cowl and the apertured aft closure comprises:
   flanges on the periphery of the aperture of the aft closure that conform to a spherical surface concentric about the ball joint; and
   an annular, rubber seal seated in an annular groove in the outer surface of the cowl to form sealing means with the flanges as the cowl is rotated thereon.

4. The nozzle apparatus of claim 1, further including a mound of solid propellant bonded to the forward side of the recessed aft closure section, to increase the propellant in the rocket and to provide thermal insulation for the thrust nozzle mechanism.

5. The nozzle apparatus of claim 1 further including inwardly projecting stop means on the sleeve, that may engage the lip of the spike nozzle member at the aftmost point of travel thereof, whereby a minimum throat area is insured for escape of the propulsive gases of the rocket.

* * * * *